July 15, 1952     S. T. DEAKIN     2,602,962
PRODUCTION OF MOLDED ARTICLES FROM
POLYTETRAFLUOROETHYLENE Filed March 25, 1949     2 SHEETS—SHEET 1

INVENTOR
STANLEY THOMAS DEAKIN

By Hoopes Leonard & Glenn
his attorneys

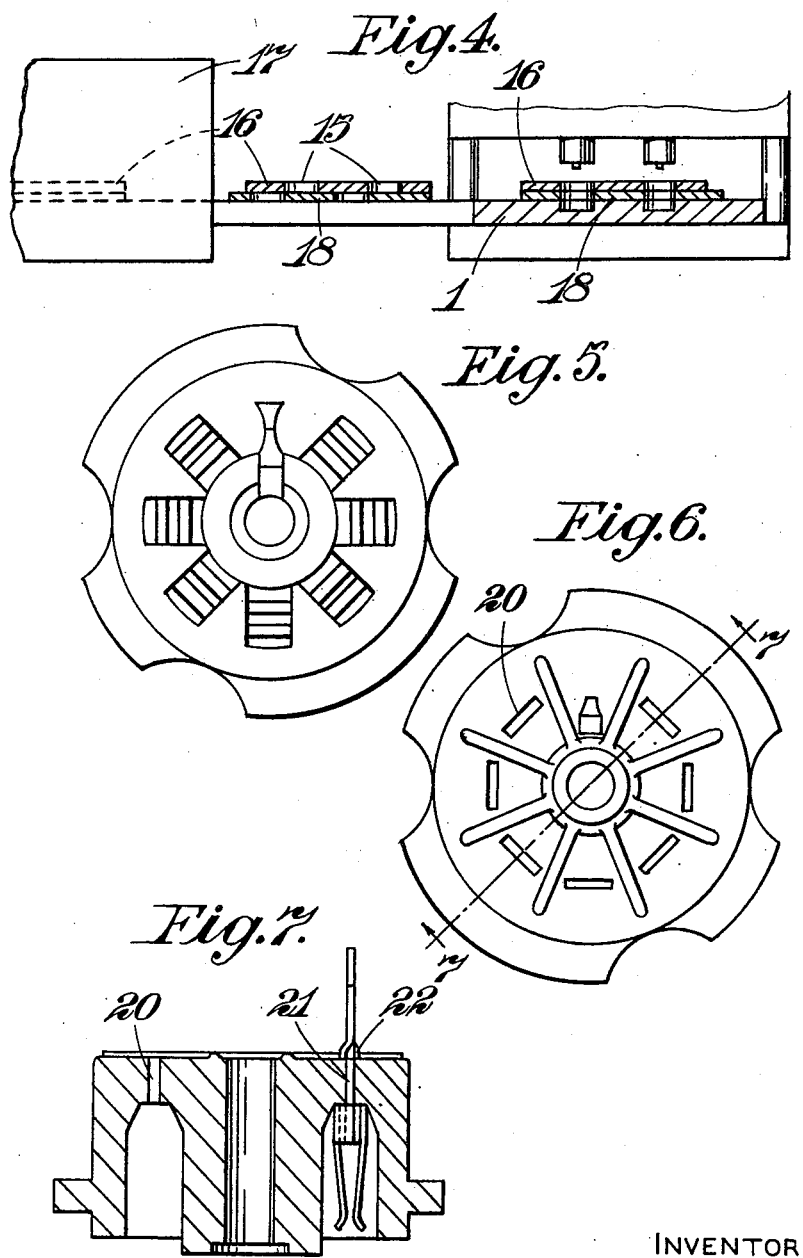

Patented July 15, 1952

2,602,962

UNITED STATES PATENT OFFICE 2,602,962

PRODUCTION OF MOLDED ARTICLES FROM POLYTETRAFLUOROETHYLENE

Stanley Thomas Deakin, Ewell West, England, assignor to British Mechanical Productions Limited, London, England Application March 25, 1949, Serial No. 83,307
In Great Britain March 25, 1948

5 Claims. (Cl. 18—55)

The invention relates to the production by moulding or forming of articles of intricate shape from "plastic" materials (e. g., poly-tetrafluorethylene) of the kind which at normal temperatures are rigid or pliable but cannot be satisfactorily moulded and which at elevated temperatures become capable of a high degree of elastic deformation.

The invention provides the method of producing moulded or formed articles from plastics of the above kind which comprises the steps of heating a pellet of the material to a temperature at which it is elastic, moulding or forming the elastic material to the desired form and cooling the material while retained in the mould to a temperature at which it loses its elasticity.

The method may include the initial step of forming the pellet by compression of powdered plastic material.

When the material employed is poly-tetrafluorethylene the temperature to which it is heated is preferably within the range of about 327° to 400° C.

It is found that the temperature of the mould or forming tool is of considerable importance in obtaining clean mouldings and may be thermostatically controlled. With poly-tetrafluorethylene a tool temperature of 160 to 200° C. is found to give the best results.

Poly-tetrafluorethylene has a high coefficient of expansion up to the temperature (about 327° C.) at which it becomes elastic and above that temperature it has a still higher coefficient of expansion. It is therefore necessary, in many cases, in order to obtain properly formed mouldings, to maintain moulding pressure on the material in the mould during cooling (at least until the temperature has fallen to about 327° C. and preferably until the temperature of the article has fallen to approximately that of the mould) to follow up shrinkage of the material. This feature of maintaining the pressure constitutes an important part of the method according to the invention. It is also necessary to prepare the mould with sufficient allowance in dimensions to accommodate the shrinkage of the material from the temperature at which the moulding pressure ceases to be effective. This temperature which may be found by experiment will normally be between 327° C. and the temperature at which the mould operates.

The pressure employed in carrying out the invention is comparatively low in relation to the pressures normally employed in the moulding of thermo-setting plastics and will be considerably less than 1,000 pounds per square inch.

In view of the high coefficient of expansion of the moulding material it is important that the pellet dimensions be chosen to allow for the expansion with heating and thereby to ensure that the hot pellet may readily be inserted into the mould.

The invention may be employed in the production of many items of electrical equipment and more especially radio equipment.

Specific applications of the method according to the invention to the production of a simple moulding from poly-tetrafluorethylene and to the production of a socket holder for a radio valve holder will now be described by way of example and further description of the invention, with reference to the accompanying drawings in which:

Figure 4 is a diagram showing the means for heating the pellets and for feeding them to the mould;

Figure 5 is a plan of the socket holder;

Figure 6 is an under plan of the socket holder;

Figure 7 is a section on the line 7—7 in Figure 6 showing one of the socket elements in position.

The washers produced according to the first application of the method are required to be of precise internal and external diameters to make a close sliding fit on a rod and inside a cylinder and cannot be produced of sufficient dimensional accuracy by compacting and sintering. The washers are accordingly produced by moulding by the method of the invention.

The pellets used to produce the washers are of simple disc form. The pellets, one for each moulding, are prepared by weighing out the appropriate quantity of powdered poly-tetrafluorethylene for one pellet, loading the quantity into a mould shaped to produce a pellet of a size and shape suitable for insertion, when hot, into the final mould, and then compacting the powder, while cold, under a pressure of about 1,000 lbs./sq. in. The weight of material required in each pellet may be determined approximately, by measuring out a volume of the powdered material equal to the volume of the final mould multiplied by a factor (usually about 3.5 but varying according to the fineness of the powder) for the compacting ratio of the material, and then weighing this volume of material. The exact weight required may then be determined by trial modifications of the approximate weight.

Figure 1:
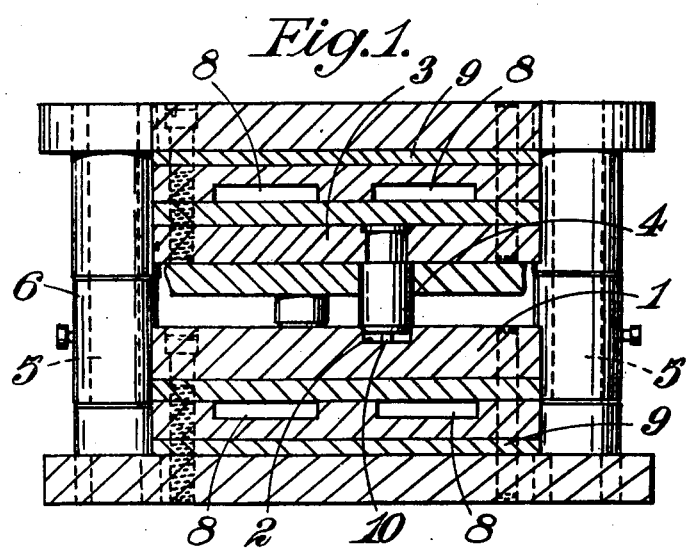
Figure 1 is a section on the line 1—1 in Figure 2 of a moulding tool for use in the production at one operation of four washers.
Figure 2:
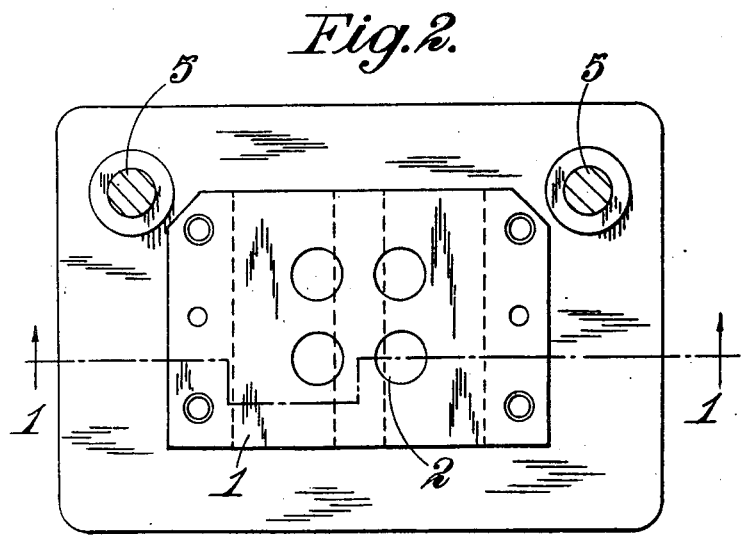
Figure 2 is a plan view of the lower half of the moulding tool.

The mould used to form the washers is shown in Figures 1 and 2. The mould is constructed in two superposed parts movable towards and away from one another. The lower part 1 has four female moulds 2 and the upper part 3 has four mould plungers 4 aligned with the female moulds. The upper part is supported on guide pillars 5 and its downward movement is limited by stop-collars 6 on the pillars. Both parts of the mould are provided with thermostatically controlled electric heating elements shown diagrammatically at 8 and each part has a heat insulating pad 9.

Figure 3:
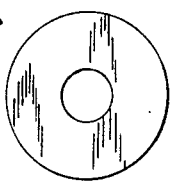
Figure 3 is a view of one of the washers.

The female moulds and the plungers are shaped to co-operate to produce washers of the required form, shown in Figure 3, and the plungers have axially projecting pins 10 to form the central holes in the washers.

Means for heating the pellets and transferring them to the moulds are shown diagrammatically in Figure 4. The pellets are loaded into sockets 15 in heat-retaining carriers 16. The carriers pass through an electrically heated tunnel oven 17 and are fed one at a time onto the lower part 1 of the mould. Each carrier has a slide 18 normally forming a bottom to the sockets 15. The slide has four holes and when the four sockets are positioned over the female moulds the slide is moved to align these holes with the sockets to permit the pellets to fall into the moulds. The plungers then operate through the sockets.

The pellets are heated in the oven to a temperature of 327°–450° C. (depending upon the size of the pellet) at which temperature the compacted powder sinters into a homogeneous mass. The mould parts are heated to a temperature of 160°–200° C. and are maintained within that temperature range. The moulding pressure is maintained for a period of 0.5 to 1 minute (depending upon the size of the article) during which time the material cools down to a temperature at which it has lost its elasticity. The moulding is then removed.

Figures 5–7 show a typical form of socket holder which may be moulded from poly-tetrafluorethylene by the method according to the invention. The holder is similiar to that described in British patent specification No. 618,677. In the holder shown, however, the slots 20 are made a close fit around the stems 21 of the socket elements and the retaining lugs 22 are forced through the slots, the material even at normal temperatures being sufficiently elastic for this purpose.

The pellets used in the production of the holders are in the form of a short cylinder with an axial throughway and, in one case, weighed about 3.2 grammes each. The time taken for the moulding operation in this case was about 30 seconds.

It is to be appreciated that the method provided by the present invention employs the principle of heating the material until it becomes elastic, deforming the elastic material and then "freezing" the material in the deformed condition.

I claim:

1. The method of moulding articles of polytetrafluorethylene which comprises the steps of heating a pellet of the material to a temperature above 327° C., transferring the heated pellet to a mould which is at a temperature of between 160 and 200° C., deforming the pellet by pressure to the shape of the mould and cooling the material in the mould to a temperature below 327° C. while maintaining pressure on the material and while maintaining the mould at a temperature between 160 and 200° C.

2. The method according to claim 1 in which the pellet is heated to a temperature between 327° C. and 450° C.

3. The method according to claim 1 and including the initial steps of compacting powdered polytetrafluorethylene into the form of the pellet and then sintering the material.

4. The method of moulding articles of polytetrafluorethylene which comprises the steps of heating a pellet of the material to a temperature above 327° C., transferring the heated pellet to a mould which is maintained at a temperature of between about 160 and 200° C., deforming the pellet by pressure to the shape of the mould, cooling the material in the mould to a temperature between about 160 and 327° C., all the while maintaining the mould at a temperature between about 160 and 200° C. and maintining pressure on the material.

5. The method of moulding articles of polytetrafluorethylene which comprises the steps of heating a pellet of the material to a temperature above 327° C., transferring the heated pellet to a mould which is maintained at a temperature of between about 160 and 200° C., deforming the pellet by pressure to the shape of the mould, cooling the material in the mould to a temperature between about 160 and 327° C., all the while maintaining the mould at a temperature between about 160 and 200° C. and maintaining pressure on the material, and removing the object from the mould and cooling it to room temperature.

STANLEY THOMAS DEAKIN.

REFERENCES CITED

The following references are of record in the file of this patent:

UNITED STATES PATENTS

| Number | Name | Date |
| --- | --- | --- |
| 2,379,247 | Muskat | June 26, 1945 |
| 2,432,668 | Kingston | Dec. 16, 1947 |
| 2,433,643 | Beach et al. | Dec. 30, 1947 |
| 2,456,262 | Fields | Dec. 14, 1948 |